United States Patent [19]
Beattie

[11] 3,871,803
[45] Mar. 18, 1975

[54] APPARATUS FOR PRODUCING AN OPTICAL MOLDING PLAQUE

[75] Inventor: John O. Beattie, Riverside, Calif.

[73] Assignee: Beattie Development Company, Stamford, Conn.

[22] Filed: Dec. 3, 1973

[21] Appl. No.: 420,819

Related U.S. Application Data

[60] Division of Ser. No. 210,488, Dec. 21, 1971, Pat. No. 3,806,079, which is a continuation-in-part of Ser. No. 841,926, July 15, 1969, abandoned.

[52] U.S. Cl............... 425/175, 249/82, 425/446, 425/808
[51] Int. Cl............................................ B29c 1/02
[58] Field of Search............ 264/1, 225-227, 264/297; 425/808, 175, 338, 408, 470, DIG. 29, 446; 249/81, 155, 102-104, 119, 121, 124-125, 160-161, 219 R, 82

[56] References Cited
UNITED STATES PATENTS

| | | | |
|---|---|---|---|
| 2,302,917 | 11/1942 | Smith | 264/1 |
| 2,337,036 | 12/1943 | Erdle | 249/119 |
| 2,392,929 | 1/1946 | Lee | 425/256 |
| 3,136,000 | 6/1964 | Slyk | 264/1 |
| 3,251,908 | 5/1966 | Wilenius et al. | 264/1 |
| 3,337,660 | 8/1967 | Bagby et al. | 264/1 |
| 3,423,488 | 1/1969 | Bowser | 264/1 |

Primary Examiner—Robert D. Baldwin
Assistant Examiner—John McQuade
Attorney, Agent, or Firm—Homer O. Blair; Robert L. Nathans; David E. Brook

[57] ABSTRACT

A mold assembly for simultaneously molding a plurality of plastic lenses. The mold assembly includes a pair of plastic plaques each of which have a plurality of mold surface portions formed thereon separated from one another by a relatively flexible reference-web portion. The assembly further includes appropriate gasketing structure which is positioned between the reference-web portions of the plaques to define a plurality of substantially isolated lens molding cavities between the mold surface portions thereof. The gasketing structure additionally includes referencing means which cooperate with and maintain the reference-web portions of the plaques at a predetermined spacing regardless of any non-uniformity in the spacing between the mold surface portions of the plaques and hence independent of any non-uniformity in the cross-sectional shape of the lenses produced therebetween. The mold assembly is designed to permit rapid alignment of the mold surfaces, to enable easy separation of the plaques from the finished lenses, and in general, to substantially simplify the entire plastic ophthalmic lens manufacturing process.

10 Claims, 15 Drawing Figures

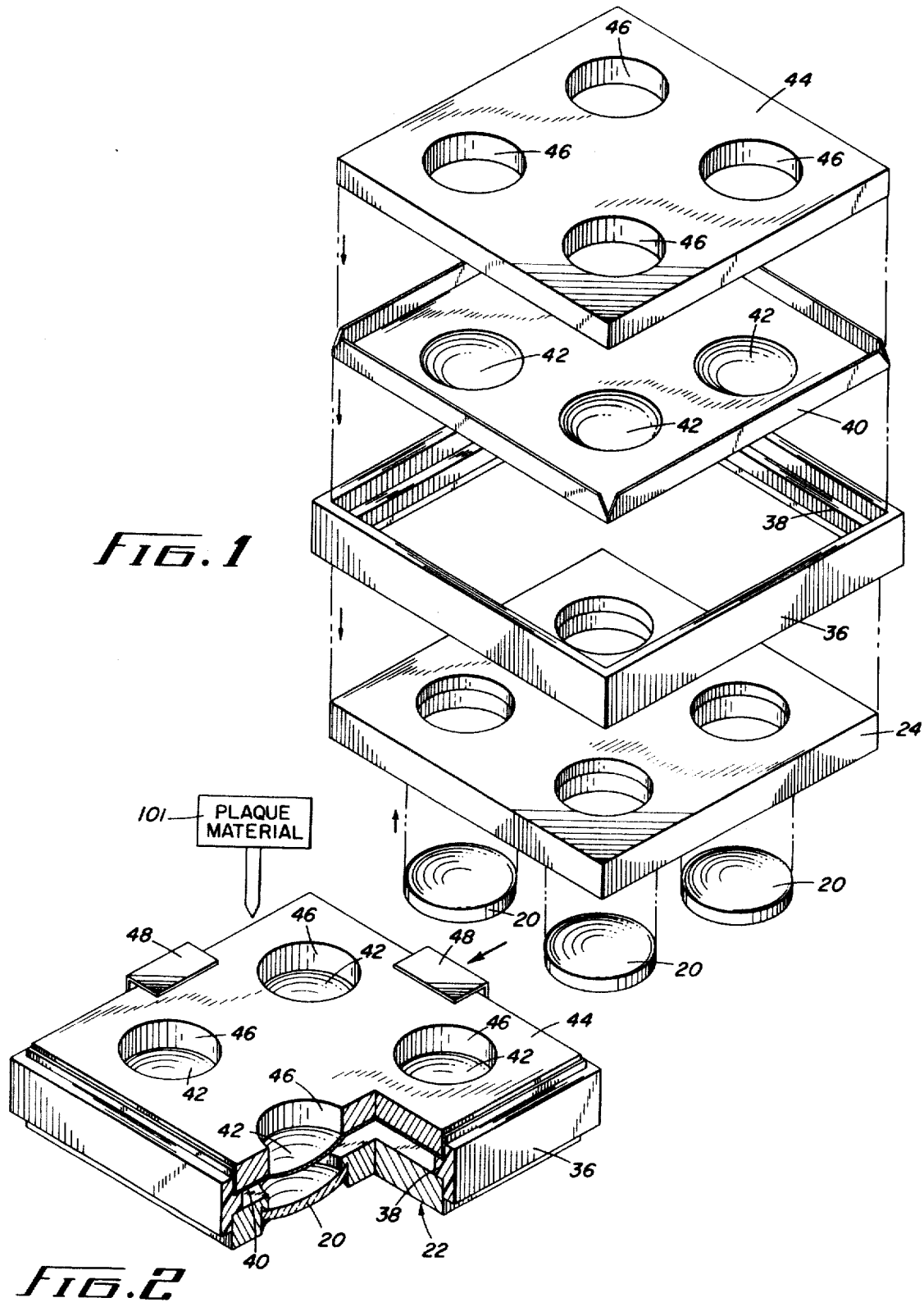

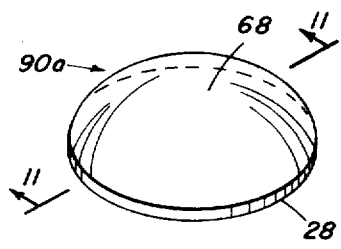 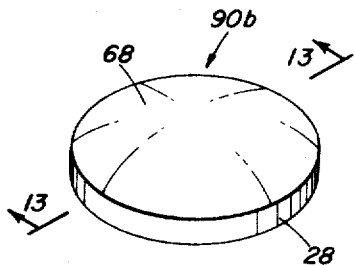 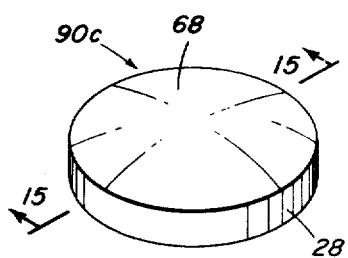
FIG. 10   FIG. 12   FIG. 14
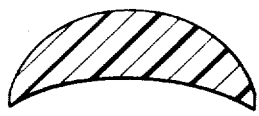  
FIG. 11   FIG. 13   FIG. 15

APPARATUS FOR PRODUCING AN OPTICAL MOLDING PLAQUE

This is a division, of application Ser. No. 210,488, filed Dec. 21, 1971, now U.S. Pat. No. 3,806,079, which, in turn is a continuation-in-part of application Ser. No. 841,926, filed July 15, 1969, now abandoned.

BACKGROUND OF THE INVENTION

1. Field of the Invention

The present invention relates to the manufacture of plastic lenses. More specifically, the present invention relates to apparatus for simultaneously casting a plurality of high-quality plastic ophthalmic lenses within a single mold structure.

2. Description of the Prior Art

The manufacture of ophthalmic lenses in plastic rather than in glass has become increasingly attractive in recent years and the reason for this interest may be attributed, at least in part, to the fact that plastic lenses provide several significant advantages over corresponding glass lenses. For one thing, plastic lenses are generally lighter in weight than their glass counterparts and thus provide more comfort to the wearer. This feature becomes particularly significant where the lenses must be highly corrective and thus inordinately thick and heavy when made from glass. Secondly, plastic has an inherently high impact resistance thus rendering them safer for use in eyewear than untreated glass. This advantage has received particular attention recently due to new Government regulations regarding the safety of eye glass lenses. Thirdly, lenses which are of complex or aspheric shapes are often much easier and less costly to produce in plastic than in glass.

Even with these advantages, however, plastic ophthalmic lenses have simply not been able to effectively compete with glass lenses in many commercial markets and it is believed that a significant reason for this failure can be attributed to present plastic lens manufacturing techniques which results in plastic lenses being significantly more expensive than their glass counterparts. Some of the causes of this greater expense may be better understood by briefly describing a conventional plastic lens manufacturing process.

Basically, plastic lenses are now cast individually between two glass molds separated by a peripheral flexible gasket and held together by a spring clip (See my prior U.S. Pat. No. 2,542,386). Thus, the production of each plastic lens requires the handling of four separate pieces, two glass molds, one gasket, and one clip. This obviously results in expensive hand labor and, consequently, a high unit cost per lens.

Furthermore, it is necessary that the lens manufacturer provide lenses in a large variety of different shapes and sizes to satisfy the many individual requirements of the wearer. For example, single vision ophthalmic lenses must be provded in a complete range of lens powers determined by their degree of spherical curvature, (i.e., generally ranging from 0 to ± 12 diopters). Also, many lenses must be provided with cylindrical powers superimposed on the spherical curvature for the correction of astigmatism. Finally, bifocal and trifocal lenses must also be made available. Accordingly, it can be seen that the number of different lenses that must be produced becomes extremely high and may run into the thousands and; in order to produce commercial quantities of these various lens combinations by prior art methods, enormous quantities of separate glass molds, gaskets and clips must be stocked and handled.

Also adding to the cost of present lens manufacturing techniques is the fact that the plastic resins, such as allyl diglycol carbonate resin (sold commercially by Pittsburgh Plate Glass Co. under the registered trademark CR–39), which are primarily used in ophthalmic lenses require curing cycles ranging from about 16 hours up to several days depending primarily on the temperatures employed. During these periods, the mold assemblies are tied up and, thus, to permit continuous production, even greater numbers of glass molds, etc., must be provided.

Notwithstanding these high inventory expenses, however, it is the handling that is required to assemble these separate mold elements into individual mold assemblies that probably contributes the major portion to the total cost of each lens. For example, it is often necessary that the two glass molds making up the mold assembly be very accurately aligned with respect to each other. This becomes particularly critical when molding non-symmetrical lenses such as cylindrical lenses or bifocals. In these situations a great deal of care must be taken to ensure that the two glass molds are in perfect angular alignment both with respect to each other and with respect to the gasket positioned between them. Also, in assembling the mold, great care must be exercised to insure that the gasket is not deformed or shifted out of position in any way by the act of assembling the mold. Since the gasket is generally used to define the shape of the final lens in the prior art, any misalignment or wedging of the gasket caused by applying an uneven force against the mold pieces in assembling them can result in an improperly formed lens.

Finally, as a result of the handling and contact of the large numbers of glass molds, breakage also becomes a significant cost factor and new, relatively expensive glass molds must continuously be made to replace damaged ones. The high amount of breakage is further increased because of the strong adhesive forces between CR–39 and glass and the relative inflexibility of glass which makes it difficult to pry the mold pieces apart to remove the lens at the end of the curing cycle.

Accordingly, to more effectively compete with glass lenses in the ophthalmic field it is desirable to provide a novel method for casting plastic lenses of either the single vision or multi-focal type, which method is fast and economical, which will minimize the required number and the amount of handling of glass master lenses, which will reduce the likelihood of breakage or damage to the glass masters, and which will generally simplify the entire manufacturing operation while providing lenses of the high quality needed in the ophthalmic field.

SUMMARY OF A PREFERRED EMBODIMENT OF THE INVENTION

By the present invention many of the above problems are overcome by enabling the efficient production of large numbers of plastic lenses in one operation. In accordance with a preferred form of the invention, glass masters are employed to mold replicate plaques of cured resin rather than to cast the lenses directly and the replicate plaques are then utilized to mold the final lenses. In practice, a plurality of glass masters, having ground and polished surfaces identical to one of the surfaces desired on the lenses, are mounted within a matrix structure which, in turn, is incorporated into a suitable matrix mold assembly. The replicate plaques formed within this assembly will then consist of a plurality of mold surfaces which will be the negative of one of the surfaces desired on the finished lens. Generally, a second plaque will then be made from a different glass matrix or from the opposite side of the same matrix to provide a plurality of mold surfaces negative to the second surface of the lenses to be produced. The two plaques are then assembled into a lens mold structure and utilized to simultaneously mold a large number of plastic lenses within the cavities formed between the mold surfaces.

By a modification of the above-described technique, a plurality of multifocal lenses may also be simultaneously cast between suitably formed plaques.

During the molding of the plaques against the glass master matrix as well as during the molding of the lenses within the plaques, significant stresses due to shrinkage, heat, and other causes are encountered which can result in the formation of poor quality surfaces on the plaques and lenses. This problem becomes particularly significant when molding a large number of lenses within a single mold structure because of the additive nature of the forces generated in each mold cavity. Accordingly, the plaques of the present invention are constructed to exhibit specific physical and chemical properties to avoid these problems and to enable the production of uniform high quality lenses.

Several significant advantages are obtained by practicing the present invention. Initially, the expensive glass master lenses are needed only to cast the replicate plaques and are not used to cast the plastic lenses themselves. Since the plaque materials according to the present invention may be cast in a curing cycle of from only 1 to 6 hours or so, as compared to the much longer periods needed to cast the lenses, the glass masters are available for use much more often then is possible in the prior art. This means that fewer glass molds must be maintained in stock thus reducing storage and manufacturing expenses. Furthermore, once the glass masters have been properly mounted within the matrix structure, they may be used over and over without requiring further individual handling or contact with one another. This greatly reduces the chances of their becoming damaged. Additionally, the plaques themselves may generally be used several times before replacement further reducing the amount of physical wear and tear to the glass masters.

Finally, by using the plaques designed in accordance with the present invention, a significant simplification of the entire lens manufacturing process is obtained. For example, with the multiple mold structure provided, it is no longer necessary to fill and seal each individual mold one at a time or to separate them individually at the end of the casting operation. All the mold cavities may be filled with a polymer at one time and the plaques may similarly be separated in one act. This one-step separation is made possible because the plaques according to the present invention are constructed to have a relatively flexible reference-web portion separating the mold surface portions thereof and this flexibility enables the plaques to be separated from the finished lenses relatively easily. In the prior art, wherein glass is used for the mold elements, it is very difficult to separate the glass mold from the lens when only one lens is being molded and if it were attempted to mold many lenses in one assembly, separation without breakage of the glass would be extremely difficult if not impossible.

Additionally, accurate alignment and positioning of the plaques to form the lens molding assembly becomes a simple, almost automatic operation. This is a particularly important feature when molding lenses of non-symmetrical shape such as cylindrical lenses or bifocals, wherein the two portions forming the mold cavity must be very accurately aligned with respect to each other. In this regard also, lenses of diverse shapes and thicknesses may be made by employing only a single sized uniform gasket structure. In the prior art, gaskets are generally used to define the thickness or cross-sectional shape of the lens, and, thus, a large variety of gaskets having unusual, expensive to manufacture, shapes must be maintained in stock. In the present invention, the lens shapes are determined by the plaques themselves and are independent of the shape of the gasket. This important feature will be explained more fully hereinafter.

In general, the present invention permits the production of ophthalmic lenses of many different types in a fast and economical manner by minimizing the required amount of individual handling as well as by greatly simplifying the entire molding operation. The present invention will also provide lenses of the high optical quality and uniformity required in the ophthalmic field.

BRIEF DESCRIPTION OF THE DRAWINGS

FIG. 1 is an exploded isometric view of the matrix mold assembly used in casting the replicate plaques of the invention.

FIG. 2 is an isometric view of the matrix mold assembly of FIG. 1, shown partly in section to illustrate the interior construction thereof.

FIGS. 10–15 are isometric views of representative lens shapes which can be made in plastic by the single replication method of the invention (FIGS. 10, 12 and 14), and sections taken along lines 11—11, 13—13 and 15—15 thereof (FIGS. 11, 13, and 15 respectively).

Similar reference characters refer to similar parts throughout the several views of the drawings.

DETAILED DESCRIPTION OF THE PREFERRED EMBODIMENTS

Figure 3:
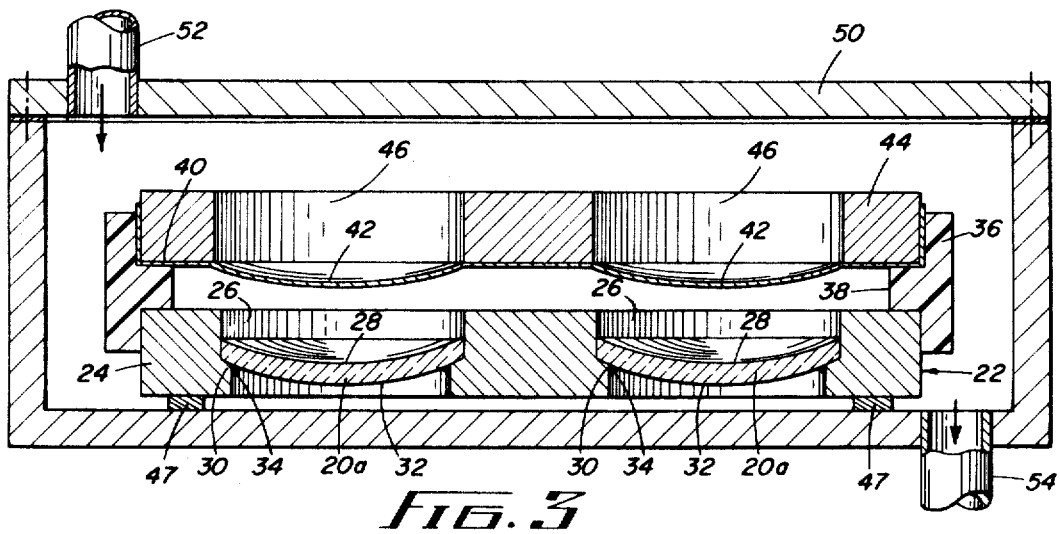
FIG. 3 is an enlarged side elevation view of a section of the matrix mold assembly for casting replicate plaques of concave glass master lens surfaces; the matrix being shown in a somewhat diagrammatic autoclave to illustrate the curing cycle.

Referring now to the drawings, the invention will be described primarily as it relates to the multiple casting of plastic ophthalmic lenses. It should be understood, however, that the invention may also be readily applied to the casting of other types of lenses, for example, lenses having two concave or two convex optical surfaces, and to other optical elements as well as to similar plastic articles. The casting of these other lenses and plastic articles would require only slight modification of the casting apparatus as will become apparent from the following detailed description.

FIGS. 1-3 illustrate the present invention as it relates to the manufacture of single vision ophthalmic lenses. As shown, a plurality of master lens elements 20 are first mounted in a matrix 22 (FIG. 2). Master lenses 20 may be made from glass in a conventional manner and are provided with at least one ground and polished surface corresponding exactly to one of the final surfaces desired on the resin duplicate lenses and shall, therefore, be considered herein as positive glass masters regardless of whether they are convex or concave in shape. While for simplicity of explanation and convenience in illustration a four lens matrix has been shown, it should be understood that in practice a much larger number of lenses, e.g., 25 or more, may be replicated at one time in a commercial application of the invention. Since ophthalmic lenses normally have two optical surfaces, one concave and one convex, separate positive glass master lenses 20 will preferably be prepared for each of these surfaces and separate matrices 22 will be provided for replicating the concave and convex optical surfaces. In this way various combinations of concave and convex surfaces can be selected at will to produce desired final lens configurations. It should be understood, however, that a single matrix in which both the convex and concave surfaces of the glass masters are ground and polished and accessible for casting may be used if desired, and, of course, only a single matrix is needed to replicate a lens with only one optical surface.

As shown in FIG. 3, when using separate matrices for the various glass master optical surfaces, one group of master lenses 20a (shown here as concave for ophthalmic lens casting) is mounted in a matrix plate 24 which is preferably formed from metal for durability, but which may also be formed of glass, ceramic or even a suitable plastic material. Each concave lens 20a is mounted in an aperture 26 in matrix plate 24 to form a matrix 22, and with the concave surfaces 28 thereof accessible for casting through apertures 26. Preferably, a ledge 30 is provided in aperture 26 to support each lens 20a against its unused convex surface 32. Also, each lens 20a is preferably secured in its position in matrix plate 24 by a fillet 34 of liquid-tight sealing compound applied between convex surface 32 and ledge 30.

Once the master lenses have been properly mounted within the matrix 22, they may be used over and over without requiring any further individual handling. As a result, the potential of their becoming broken or otherwise damaged is reduced significantly. Furthermore, by being recessed within the apertures 26, they are well protected from accidental contact with other components which could scratch or mar their surfaces. Therefore, by the present construction, a major expense in prior art lens manufacturing techniques is greatly reduced.

A negative replicate plaque, i.e., a plaque which negatively reproduces the positive glass masters, is then cast from cured resin against the concave surfaces 28 of the glass master lens 20a in matrix plate 24, and this negative replicate plaque will serve as one mold surface for casting the final multiple plastic lenses. Some plaque resins may be cast directly against the matrix and cured under atmospheric pressure, in which case one need merely surround the matrix with an edge gasket, fill the matrix with an appropriate monomer resin, preferably cover the assembly with a backing plate and cure. However, many resins, and particularly those preferred resins used for making plaques in which high quality optical resin duplicate lenses can be cast, require a flexible member as the backing plate. The flexible member can distort slightly to accommodate the polymerization shrinkage of the resin during curing; and in addition, can be used to transmit positive pressure to the resin as it cures to assure that the resin does not draw away from the glass master surfaces or warp or crack under the stresses of polymerization shrinkage. The flexible member thus helps insure that the negative replicate plaque will contain accurate and flawless replications of the glass master optical surfaces.

Accordingly, with reference to FIGS. 2 and 3, a matrix mold assembly is prepared by surrounding the matrix 22 with a peripheral gasket 36 preferably formed of a suitable flexible material such as plasticized vinyl, a polyethylenepolyisobutylene mixture, or even flexible tape. Gasket 36 is provided with an inwardly directed central ridge 38 which serves both to support the flexible backing member and to provide the proper spacing between the backing member and the glass master lenses.

The flexible backing member preferably comprises a flexible membrane 40 made from aluminum foil of about 0.003 to about 0.040 inch in thickness; however, other thin metal foils may be used as well as a number of synthetic materials including cellulose acetate, Teflon, nylon, various vinyls, polyethylene and the like. Flexible membrane 40 is additionally deformed by spinning, stamping or the like to form a plurality of sectors 42 which conform in number and generally in shape to the optical surfaces of the glass masters to be replicated. Flexible membrane 40 is preferably held in position on gasket 36 by a back-up plate 44 having cutouts 46 therein corresponding in shape and position to sectors 42.

Matrix 22, gasket 36, flexible membrane 40 and backup plate 44 are assembled together as shown in FIG. 2 and may be held securely by resilient clips 48 or the like spaced about the periphery of the assembly as shown in FIG. 2. Once assembled, liquid monomer resin is cast therein by lifting an edge of gasket 36 and introducing the monomer resin by pouring, or under pressure from a reservoir 101 in a known manner.

With reference now to FIG. 3, curing of the replicate plaque within the matrix mold assembly may be accomplished by placing it in a suitable autoclave 50 on a pair of props such as bars 47 which permit free circulation of fluid around the assembly. The structure of autoclave 50 may be similar to that disclosed in copending application Ser. No. 841,757 filed July 15, 1969, now abandoned. Autoclave 50 may be pressurized by a fluid circulated therethrough from inlet 52 through outlet 54. Preferably, the fluid will comprise water pressurized to the required pressure level and heated to the curing temperature of the particular plaque resin being cured. Alternatively however, the fluid may comprise a gaseous substance such as air or an inert gas such as carbon dioxide or nitrogen, suitably pressurized. Since gases, however, are generally poorer conductors of heat than water, the use of a pressurized gas in autoclave 50 will ordinarily require a longer curing cycle.

Under the pressure of the fluid within the autoclave, sectors 42 of flexible membrane 40 will deform slightly to press the surface of the plaque resin against optical surfaces 28 and maintain it in contact with the optical surfaces during curing. Sectors 42 will further deform in response to any polymerization shrinkage of the plaque resin during curing to maintain the pressurization and to insure continuous contact between the plaque resin and optical surfaces 28 for accurate replication. Also, the flexible foil is a good heat conductor and thus enables accurate temperature control over the plaques during cure.

Replicate plaques cast from the preferred materials of the present invention (which will be described in detail hereinafter) should generally be cast under a pressure of between 50 and 100 psi for best results, and at temperatures within the range of about 40° to about 95°C. Suitable curing times are usually within the range of about 1 to 6 hours.

Upon completion of the curing cycle, a negative replicate plaque 56 (FIG. 8) which negatively replicates the concave surfaces 28 of glass master lenses 20a is produced and removed from the mold assembly shown in FIG. 3.

Figure 7:
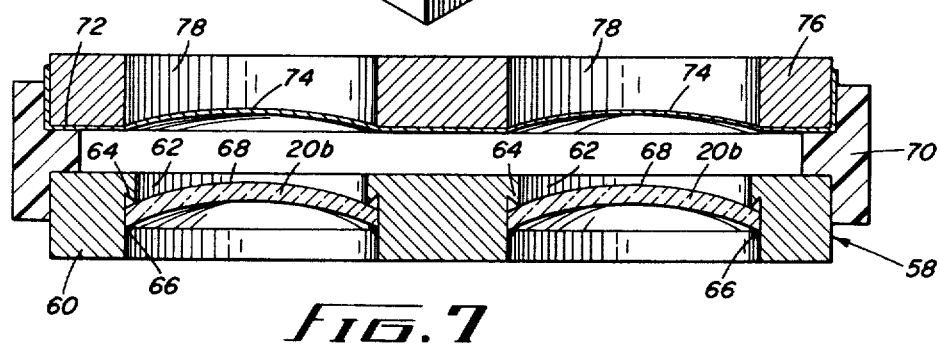
FIG. 7 is a side elevation view in section of an alternative matrix mold assembly similar to that shown in FIG. 4.

Referring now to FIG. 7, a separate matrix 58 may be provided for the casting of the negative replicate plaque for the other surface of the plastic lenses that it is desired to produce. Matrix 58 is very similar to previously discussed matrix 22 (FIG. 3) and comprises a matrix plate 60 having apertures 62 therein for the mounting of glass master lenses 20b having the desired lens surfaces 68 (shown here as convex for ophthalmic lens casting). Glass masters 20b are preferably recessed in apertures 62 against a ledge 64 for protection and sealed in place by a liquid-tight sealing compound 66 such that the convex surfaces 68 thereof are accessible for casting at one side of matrix 58 through apertures 62.

A mold assembly is then formed by providing matrix 58 with a peripheral gasket 70 similar in all respects to previously discussed gasket 36. A flexible membrane 72 again similar to previously discussed membrane 40 is mounted on top of gasket 70 in spaced relationship with glass master lenses 20b. Flexible membrane 72 differs from membrane 40, however, in that the deformed sectors 74 are made with a concave surface to correspond to the curvature of the convex optical surfaces 68 of master lenses 20b. Membrane 72 is held in position on gasket 70 by a backup plate 76 having apertures 78 herein to accommodate the deformed sectors 74. The assembly may be held together by resilient clips or the like similar to previously discussed clips 48.

A negative replicate plaque 80 (FIG. 8) which negatively replicates the convex surfaces 68 of glass master lenses 20b is then cast in the mold structure shown in FIG. 7 in the same manner as previously discussed and as illustrated in FIG. 3. Generally, the same resins used for plaque 56 will be used for plaque 80 although this is not essential.

Figure 8:
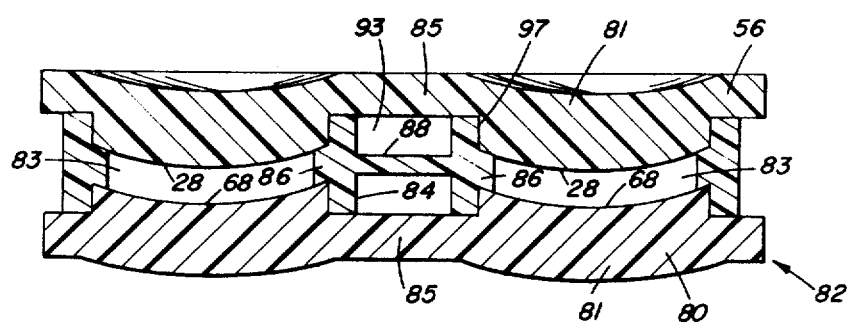
FIG. 8 is a side elevation view in section of a replicate mold with separate ring gasketing, formed from replicate plaques produced in the matrix mold assemblies of FIGS. 3 and 7.
Figure 9:
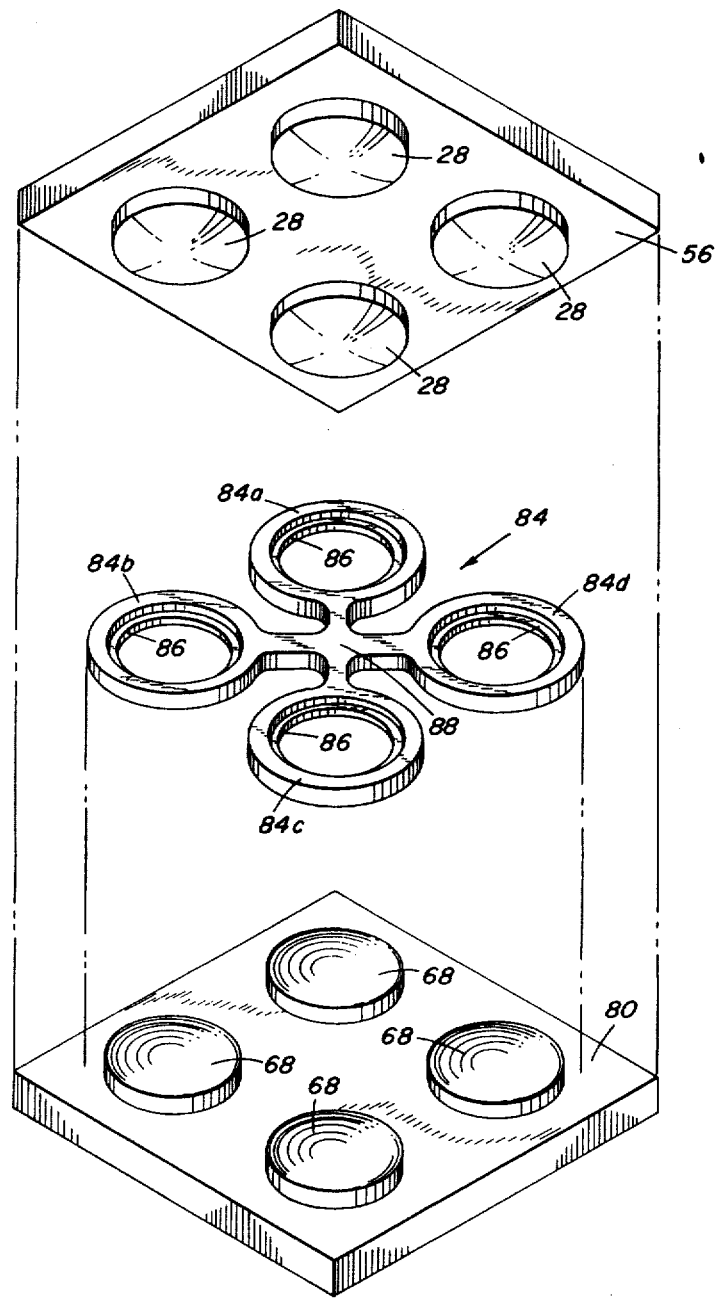
FIG. 9 is an exploded isometric view of the replicate mold of FIG. 8.

Negative replicate plaques 56 and 80 are then combined into a single replicate mold assembly 82 as shown in FIG. 8 which is to be used for casting the plurality of final, plastic duplicate lenses. Plaques 56 and 80, as shown, are maintained in aligned, spaced relationship by gasketing means, and they define between them a plurality of separate lens forming mold cavities 83 each of which has a contour corresponding to the two optical surfaces of the original glass master lenses 20a and 20b. The gasketing means may comprise a multiple ring gasket 84 as shown more clearly in FIG. 9 to isolate the lens cavities from one another during polymerization as will be explained more fully hereinafter. Each ring 84a, 84b, 84c and 84d may be provided with an interior central ledge 86 which serves to support plaques 56 and 80 with the desired spacing although this is not essential. The individual rings of gasket 84 may also be joined by webbing 88 (FIGS. 8 and 9) for convenience although it should be understood that they may also be provided separately if desired. Ring gasket 84 is preferably formed of the same flexible materials as the previously discussed peripheral gaskets 36 and 70.

The individual plastic, duplicate lenses of CR-39 or other material may then be molded in lens molding assembly 82 by placing the ring gasket 84 onto one of the plaques, preferably the concave plaque 80, filling the cavities 83 with the appropriate liquid monomer resin; and then pressing the opposite plaque down onto gasket 84. Typically, the resins used in casting the final plastic lenses do not require the application of positive pressure and, therefore, the lenses may be cured directly in replicate mold 82. Referring to FIGS. 10-15, there are shown typical ophthalmic lenses 90a, 90b and 90c that may be molded in accordance with the present invention in a replicate mold assembly such as shown in FIG. 8.

Figure 4:
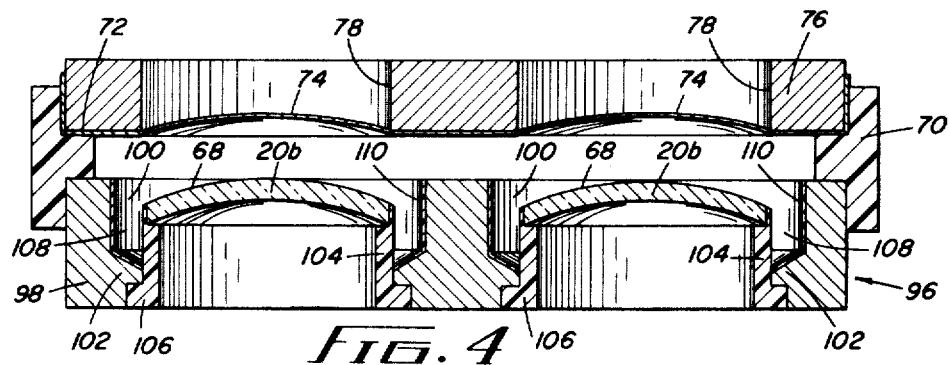
FIG. 4 is a side elevation view in section of a matrix mold assembly for producing replicate plaques with integral gasketing means, of convex glass master lens surfaces.
Figure 5:
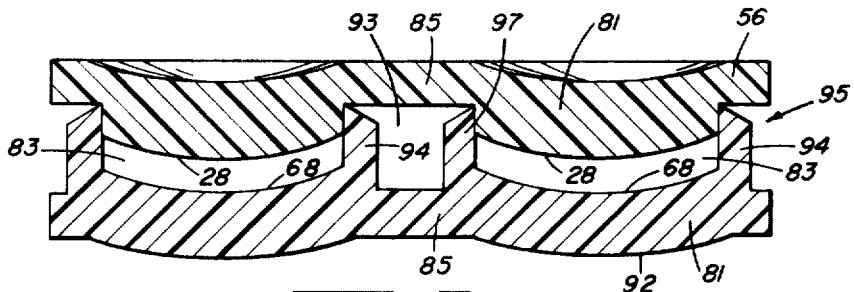
FIG. 5 is a side elevation view in section of a replicate mold with integral gasketing, formed from replicate plaques produced in the matrix mold assemblies of FIGS. 3 and 4.
Figure 6:
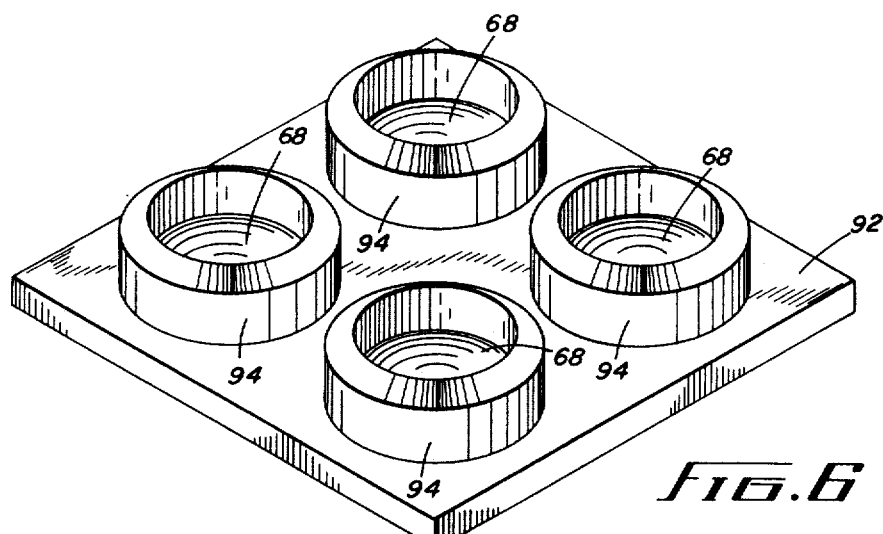
FIG. 6 is an isometric view of a replicate plaque produced in the matrix mold assembly of FIG. 4.

Instead of employing a separate gasketing structure as shown in FIG. 8, the replicate mold may alternatively be made with an integral gasketing means of the type illustrated in FIGS. 4 and 5. Referring specifically to FIG. 5, a negative replicate plaque 56 of the concave lens surfaces 28 is employed which is identical to and may be cast in the same manner discussed previously. However, a somewhat different negative replicate plaque 92 is provided for the convex glass master surfaces 68. This plaque is constructed with an integral upstanding rim 94 surrounding each optical surface 68 which is replicated thereon. When the plaques 56 and 92 are then combined to form replicate mold assembly 95, rims 94 will surround and engage with plaque 56 to define and isolate the separate lens cavities 83 while, at the same time, define the orientation between the two plaques as will be explained in greater detail hereinafter. These rims might also be provided with pointed ends to more effectively isolate the lens cavities from one another if desired.

Plaque 92, with its integrally cast rims 94, may be produced against a matrix 96 as shown in FIG. 4. Matrix 96 comprises a matrix plate 98 having apertures 100 therein in which glass master lenses 20b are mounted. Each aperture 100 is preferably provided with an internal shoulder 102 adjacent the lower end thereof. The glass master lenses 20b are each mounted on a support ring 104 which is preferably formed from a material which will readily release from the plaque resin cast thereagainst. One particularly suitable material for support rings 104 is polytetrafluoroethylene, sold commercially as Teflon or Fluon. Support rings 104 are formed with a bottom flange 106 which engages under rim 102 to hold support ring 104 and the glass master lens 20b supported thereby in place. As can be seen, the diameter of support ring 104 is smaller than the diameter of aperture 100 so that a mold annulus 108 surrounds each glass master lens 20b. Annulus 108 provides the mold space into which each rim 94 of plaque 92 is cast. Preferably, the walls of annulus 108 are also provided with a coating 110 of polytetrafluoroethylene to further facilitate the release of plaque 92 from the mold structure.

Matrix 96 is incorporated into a matrix mold assembly as shown in FIG. 4 by the addition of a peripheral gasket 70, a flexible membrane 72 and a backup plate 76 which are identical to the corresponding members previously discussed with respect to the mold structure of FIG. 7. Plaque 92 is then cast therein, preferably under positive pressure in an autoclave.

It will be understood that other forms of gasketing may be used without departing from the scope of the present invention, and further, that the integrally cast rims 94 or the like may be alternatively provided on the replicate plaque of the concave lens surfaces and provision made on the replicate plaque of the convex lens surfaces for mating therewith to provide the desired gasketing function.

As was described above, the replicate mold assemblies illustrated in FIGS. 5 or 8 are designed primarily to permit the simultaneous molding of large numbers of plastic lenses therein. The accomplishment of this goal has necessitated the solution of several major problems. For example, as was mentioned above, significant forces are generated during the molding of CR-39 (as well as other plastic lens materials) caused by shrinkage of the CR-39 during polymerization as well as by temperature variations. Unless properly compensated for, these stresses can result in improper contact between the lenses and the replicate plaques thus ruining their surfaces, or they can cause the plaque to warp or crack. When many lenses are cast within a single mold structure and the size of the plaques are thus increased, these stresses become additive in nature and increase significantly. Thus, it is necessary that the replicate mold assembly be designed to withstand these forces and to substantially isolate the reactions taking place within each mold cavity.

A further problem created by multiple casting results from the fact that discontinuities can easily result in thinner areas of the CR-39 during the polymerization process which can ruin the entire lens structure. Thus, it is also important that the plaques and associated gasketing structure be designed to physically retain the CR-39 in the lens cavities and to prevent as much as possible, its getting into the spaces between the cavities.

Yet another problem relates to the ability of the plaques to be separated from both the cured plastic lenses and from the master matrix. In this regard, the plaques must be sufficiently flexible to enable separation to be accomplished in one operation without damaging them in any way and yet must not be so flexible as to deform during the polymerization process and thus ruin the accuracy of the optical surfaces either on the plaque or on the lenses molded thereagainst.

In order to satisfactorily overcome all of these problems the replicate plaques of the present invention are preferably formed to have a plurality of relatively thick lens receiving or mold portions 81 (FIGS. 5 or 8) separated from one another by reference-web portions 85. The web portions are made relatively thin and flexible and thus act to prevent stresses generated within one mold cavity from interfering with the polymerization process taking place in other cavities. In particular, it has been found that the mold portions 81 of the plaques should have a thickness of between about 6 to about 15 mm. while the reference-web portions should have a thickness of between about 3 to about 6 mm. For optimum results, a mold portion thickness of about 9 – 10 mm. and a web thickness of about 3 mm. is preferred. It should be understood, however that in some situations it might be desirable to secure a suitable backing plate to the back surface of the plaques which will permit the use of somewhat thinner plaques.

The spacing between the mold portions is not particularly critical, but it should be sufficient to permit the gasket to be freely positioned therebetween and to enable heat exchange fluids to be freely passed about the mold cavities when desired. In this regard, the provision of the relatively thin reference-web portions in conjunction with appropriate gasketing structure such as the ring gaskets 84 or the integral gaskets 94, defines a path 93 to permit exchange fluids to flow between the lens cavities as well as around peripheral areas of the assembly. This enables a finer degree of control over the polymerization reactions taking place in the mold cavities. For this reason also, it is desirable to position the lens forming mold cavities in a generally regular orientation, preferably in an array of rows and columns although other arrays may also be employed.

The plaque design of the invention also enables the CR-39 resin to be substantially retained within the mold cavities 83 of the replicate mold assembly without allowing it to seep into the spaces between the cavities. This is because the gasketing structure, whether integral or separate, can readily be positioned between the web portions of the plaques and maintain the mold cavities in a substantially fluid-tight condition.

Finally, the thin reference-web portions of the plaques make them sufficiently flexible to enable the entire plaque to be readily separated form both the cured plastic lenses and the matrix assembly with a minimum of difficulty. As mentioned previously, this is a serious problem in the prior art. Because of the relative inflexibility of glass, many molds are broken in the process of separating the mold from a single lens molded thereagainst. Obviously, glass could not be readily used as a mold member to cast many lenses thereagainst. Also, since separation of the plaques from the master matrix is preferably carried out at an elevated temperature to minimize contraction differences between the cooling matrix and plaques, easy separation is made that much more necessary.

Thus, by the present design, the solution to these problems have been satisfactorily overcome. In addition, however, it has been found that the present design also provides other advantageous features which greatly simplifies the lens manufacturing process. For one thing, it can be seen that the gasket 84 in FIG. 8 or the integral gasket structure 94 of FIG. 5 are positioned between the web portions 85 of the plaques and thus act to define the spacing between the web portions of the plaques without interfering with the spacing between the mold portions 81 of the plaques. This means that the web portions 85 may be considered as reference portions by which the plaques may be positioned relative to each other. In other words, the gasket is not needed to define the shape of the lenses to be molded as in the prior art because this can be accomplished simply by the construction of the mold portions of the plaques themselves entirely independent of the spacing between the reference-web portions of the plaques. Thus, it becomes possible to employ a single gasket structure of uniform size irrespective of the type of lens that it is desired to produce.

This feature becomes particularly significant when casting cylindrical lenses or other lenses of varying cross-sectional thickness. In the prior art method of manufacturing lenses of this type, it is necessary to provide a large inventory of gaskets having variable heights to produce the appropriate lens shape. These gaskets, being of unusual shape, are thus quite expensive to manufacture. In the present invention, a single gasket having a regular, easy to manufacture, shape is all that is required to define a constant spacing between the web portions and to isolate the lens cavities and this enables a significant reduction in manufacture costs.

Furthermore, the design of the present mold assembly makes it an almost automatic procedure to align the several mold surfaces of the two plaques together in the proper orientation. In the prior art, particularly in producing non-symmetrical lenses such as bi-focals or the like, angular alignment of the two mold portions is a very critical and time consuming operation. In the present invention, alignment may be accomplished rapidly and accurately because the plaques are designed with shoulders 97 between the mold portions 81 and the reference-web 85 (FIGS. 5 or 8) with which the gasket may cooperate. The presence of these shoulders enables correct angular alignment of the plaques relative to each other to be done almost automatically as well as assisting in isolating the CR-39 within the mold cavities.

In addition to angular alignment of the mold elements, great care must be taken in the prior art to ensure that the gasket is not deformed or displaced by the act of assembling the mold elements together. This is critical because the gasket is generally used to define the shape of the lens and hence any deformation of the gasket will affect the final lens shape. Such deformation can result from squeezing the gasket against the mold elements too tightly causing it too thicken and also by improperly seating the two mold elements together. In the prior art, wherein one lens is molded at a time, if the vertical pressure exerted upon the upper mold piece in assembling the mold varies across the top of the mold piece, a tilting or "wedging" action could result causing undesirable distortion in the thickness of the lens. In the present invention, wherein plaques containing molding chambers for 25 or more lenses are provided, any wedging, if it occurs at all, will be greatly reduced because a much greater inequality of forces at each end of the plaque would be necessary to produce comparable distortion due to the impedance of the many gaskets.

Similarly, any lateral forces applied to the upper mold piece in the prior art could cause a lateral shifting of the upper mold piece relative to the lower mold piece and, again, result in an improperly shaped lens. With the multiple plaque arrangement, any lateral forces will have much less effect because of the greater mechanical impedance presented by the many gaskets positioned between the plaques.

Thus, by the present invention, a replicate mold assembly is provided that will enable the simultaneous molding of a plurality of plastic lenses in one operation, and that in doing so, greatly simplifies the entire plastic lens manufacturing process by eliminating a great deal of the hand labor previously required to produce high quality lenses.

Up to this point, very little has been said herein concerning the materials of which the plaques 56, 80 or 92 should be constructed. Materials which have been found to be suitable, however are described in detail in commonly assigned copending continuation-in-part application Ser. No. 210,519 entitled Polymeric Replica Molds and Replication Processes For Producing Plastic Optical Components by John O. Beattie filed Dec. 21, 1971, now U.S. Pat. No. 3,830,460 and copending continuation-in-part application Ser. No. 210,518 entitled Double Replication Molding Process For Producing Plastic Optical Elements by John. O. Beattie filed Dec. 21, 1971.

As described in these applications, the plaque materials must be at least moderately stiff so as to be able to resist distortion of the plastic lenses during their cure while at the same time they must have balanced adhesion to the lenses so as to follow them during cure and release from them after cure.

In this regard, CR-39 shrinks significantly during polymerization, and the plaques must be capable of following the lens as it shrinks to maintain the plaque surface in contact with the lens during its cure to ensure faithful reproduction of the mold surface on the lens. At the same time, however, the plaques must not be too flexible so as to distort or otherwise damage the optical surface formed thereon.

Furthermore, the plaques must be releasable from the master matrix, resistant to solvent attack by the plastic lens material, as well as by the master lenses, thermally stable at all necessary molding temperatures, and, above all, capable of forming high quality ophthalmic lens surfaces.

Among the compositions referred to in the above-mentioned copending applications and found to have these properties and be suitable for use in this invention are the following five polymeric compositions:

1. Polymethyl methacrylate cross-linked with a minor amount of a cross-linking agent. Preferably, the polymethyl methacrylate is cross-linked with from about 5 to about 30 percent of a cross-linking agent.

2. A copolymer formed from 99–20 parts of methyl methacrylate and 1–80 parts of acrylonitrile. It is not necessary to cross-link this copolymer, although minor amounts of a cross-linking agent are preferable. In a more preferred embodiment this copolymer contains 65–25 parts methyl methacrylate and 35–75 parts acrylonitrile, and the copolymer is cross-linked with about 5–30 percent of a cross-linking agent. It has been found that an outstanding replicate plaque can be produced from a 30/70 copolymer of methyl methacrylate/a- crylonitrile cross-linked about 2 to 15 percent, which is the most preferred embodiment.

3. Styrene cross-linked with minor amounts of a cross-linking agent. In a more preferred case, the polystyrene is cross-linked with from 1 to 20 percent of a cross-linking agent.

4. A copolymer formed from 90–10 parts of styrene and 10–90 parts of acrylonitrile, with the copolymer being cross-linked with minor amounts of a cross-linking agent. In a more preferred embodiment, this copolymer comprises 80–60 parts of styrene and 20–40 parts of acrylonitrile, cross-linked with 5–20 percent of a cross-linking agent.

5. A copolymer formed from 90–10 parts styrene and 10–90 parts methyl methacrylate cross-linked with 5–30 percent of a cross-linking agent. In a more preferred embodiment, this copolymer is comprised of 80–30 parts styrene and 20–70 parts methyl methacrylate with about 10–20 percent cross-linking agent. The most preferred copolymer comprises about 50 parts of both styrene and methyl methacrylate with about 10 percent cross-linking agent.

Some of the preferred polymeric compositions set out above are cross-linked. Suitable cross-linking agents are those monomers which possess a functionality exceeding two, i.e., polyfunctional. Those skilled in the art will know many suitable cross-linking agents. The preferred cross-linking agents are glycol dimethacrylates which can be produced by esterifying methacrylic acid with a glycol containing from 2 to 4 carbon atoms or with a polyglycol having from 4 to 8 carbon atoms. Such glycols include diethylene glycol, triethylene glycol, tetraethylene glycol, dipropylene glycol and the like as well as ethylene glycol and propylene glycol.

Another preferred cross-linking agent is divinylbenzene. Divinylbenzene is obtainable commercially as a 55 percent solution, with the major impurities being believed to be ethyl vinyl benzene, diethylbenzene and a variety of non-volatile components. This mix can be used as received, or it can be purified by fractionation to give divinylbenzene of better than 95 percent purity. The purified divinylbenzene is preferred.

Additional cross-linking agents which are suitable include allyl methacrylate, diethylene glycol dimethacrylate, triethylene glycol dimethacrylate, tetraethylene glycol dimethacrylate, triethylol propane trimethacrylate, glyceryl trimethacrylate, pentaerythritol tetramethacrylate and the corresponding acrylates. Others include triallyl cyanurate, diallyl phthalate, diallyl adipate, diallyl succinate, diallyl maleate, diallyl fumarate, and diallyl diglycolate.

In this description, the amount of cross-linking agent used is specified in terms of weight percent of the polymer or copolymer.

The present invention thus provides a technique for producing multiple plastic duplicate lenses or similar articles in commercial quantities from original glass masters. The technique is highly efficient and substantially reduces the manufacturing expenses presently found in plastic lens production.

It should be understood, however, that the above-described embodiments are meant to be preferred embodiments only and that many other modifications and alterations should readily present themselves to those skilled in the art. Accordingly, the invention should be limited only as required by the scope of the following claims.

I claim:

1. Apparatus for molding a replicate plaque from plastic monomer for use in simultaneously molding a plurality of plastic optical elements comprising:
   a. a first support plate;
   b. means on said first support plate for defining a mold surface, said mold surface including a plurality of master surfaces to be negatively reproduced on said replicate plaque;
   c. a second support plate;
   d. a flexible member having inner and outer surfaces supported by said second support plate, said flexible member having a plurality of sectors formed thereon, the outer surfaces of said sectors having the same general shape as said master surfaces;
   e. means for supporting said first and second support plates in spaced relationship with said plurality of sectors being in substantial alignment with said plurality of master surfaces for defining a mold cavity between the inner surface of said flexible member and the mold surface of said first support plate within which said replicate plaque may be molded;
   f. means for filling said mold cavity with said plastic monomer; and
   g. means for applying a positive pressure to the outer surface of said flexible member during the molding of said plaque to cause said sectors to deform and maintain said plaque in intimate contact with said master surfaces during the molding thereof.

2. Apparatus as recited in claim 1 wherein said second support plate includes means for defining a plurality of apertures, and further includes means for supporting said plurality of flexible sectors adjacent said apertures for enabling them to deform and maintain the replicate plaque in contact with said master surfaces during the molding thereof.

3. Apparatus as recited in claim 2 wherein said outer surfaces of said flexible member sectors are accessible through said apertures to said positive pressure applying means.

4. Apparatus as recited in claim 1 wherein said flexible member comprises a foil having a thickness of between about 0.003 to about 0.040 inches.

5. Apparatus as recited in claim 1 wherein said first support plate includes a plurality of apertures and wherein said plurality of master surfaces comprise a plurality of master elements recessed within said apertures.

6. Apparatus as recited in claim 5 wherein said master elements are constructed of glass.

7. Apparatus as recited in claim 1 wherein said first support plate includes means for supporting said plurality of master surfaces in a generally regular array.

8. Apparatus as recited in claim 1 wherein said support plate support means comprises gasketing means for maintaining said mold cavity in fluid-tight condition.

9. Apparatus as recited in claim 1 and further including means for controlling the temperature of said plaque during the molding thereof.

10. Apparatus as recited in claim 9 wherein said flexible member comprises a heat conductive foil for transferring heat between said temperature control means and said plaque during the molding thereof.

* * * * *